(12) United States Patent
Sun et al.

(10) Patent No.: US 7,777,989 B2
(45) Date of Patent: Aug. 17, 2010

(54) MAGNETIC WRITER INCLUDING AN ELECTROPLATED HIGH MOMENT LAMINATED POLE

(75) Inventors: Ming Sun, Eden Prairie, MN (US); Ibro M. Tabakovic, Edina, MN (US); Steve C. Riemer, Minneapolis, MN (US); Mark T. Kief, Lakeville, MN (US); Venkateswara R. Inturi, Shakopee, MN (US); John A. Hawkins, Big Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 906 days.

(21) Appl. No.: 11/451,236

(22) Filed: Jun. 12, 2006

(65) Prior Publication Data

US 2007/0285835 A1 Dec. 13, 2007

(51) Int. Cl.
*G11B 5/147* (2006.01)
(52) U.S. Cl. ....................................... 360/126
(58) Field of Classification Search ........................ None
See application file for complete search history.

(56) References Cited

U.S. PATENT DOCUMENTS

| | | | |
|---|---|---|---|
| 5,311,387 A * | 5/1994 | Mallary | 360/125.02 |
| 5,379,172 A | 1/1995 | Liao | |
| 6,628,478 B2 | 9/2003 | Gill | |
| 6,778,357 B2 | 8/2004 | Tabakovic et al. | |
| 6,778,358 B1 | 8/2004 | Jiang et al. | |
| 6,791,796 B2 | 9/2004 | Shukh et al. | |
| 7,120,988 B2 * | 10/2006 | Le et al. | 29/603.07 |
| 7,382,573 B2 * | 6/2008 | Carey et al. | 360/123.03 |
| 7,388,732 B2 * | 6/2008 | Le | 360/125.08 |
| 7,464,457 B2 * | 12/2008 | Le et al. | 29/603.16 |
| 7,466,515 B2 * | 12/2008 | Carey et al. | 360/135 |
| 2002/0163759 A1 | 11/2002 | Kanada et al. | |
| 2005/0068665 A1 * | 3/2005 | Le et al. | 360/97.01 |
| 2006/0044680 A1 * | 3/2006 | Liu et al. | 360/126 |
| 2007/0133132 A1 * | 6/2007 | Carey et al. | 360/324.11 |
| 2007/0139820 A1 * | 6/2007 | Carey et al. | 360/126 |
| 2007/0230044 A1 * | 10/2007 | Han et al. | 360/125 |

* cited by examiner

*Primary Examiner*—Mark Blouin
(74) *Attorney, Agent, or Firm*—Kinney & Lange, P.A.

(57) ABSTRACT

A magnetic writing pole writes perpendicularly to a magnetic medium. The writing pole includes a multilayer structure with alternately electroplated magnetic layers and electroplated non-magnetic layers. The writing pole has a down-track thickness near the magnetic medium of less than about 500 nm.

20 Claims, 3 Drawing Sheets

MAGNETIC WRITER INCLUDING AN ELECTROPLATED HIGH MOMENT LAMINATED POLE

BACKGROUND OF THE INVENTION

The present invention relates to magnetic writers. More particularly, the present invention relates to an electroplated multilayer high moment structure for use in a magnetic writer.

Magnetic heads typically include both a write element and a read element. The read element includes a magnetoresistive (MR) or giant magnetoresistive (GMR) element for reading information from a recording layer of a recording medium (e.g., a magnetic disc). The write element is configured to generate magnetic fields that align magnetic moments of the recording layer to represent bits of data.

Write elements can include two poles, each of which have a pole tip. The pole tips are separated by a gap layer at an air-bearing surface (ABS), which faces the recording medium. A conductive coil surrounds a section of a magnetic circuit formed by the two poles. Current signals in the coil induce magnetic signals in the two poles, which are used to write data to the recording medium. The write element may alternatively include a single pole for writing data to the recording medium.

In perpendicular recording, magnetic signals are conducted through a writing pole in a manner that orients the magnetic moments of the recording medium perpendicularly to the surface of the recording medium. The amount of data that can be recorded in a given area (i.e., the areal density) can be improved by reducing the surface area of the pole tip of the writing pole and by increasing the linear density and the frequency at which data is recorded.

The writing pole may be formed by sputtering a single layer of high magnetic moment materials with a high saturation flux density. However, sputtered high magnetic moment films exhibit high coercivity, poor anisotropy, and high intrinsic stress. This causes high remnant magnetization in the writing pole, which can lead to on-track erasure (OTE) of data. The remnant fields that cause OTE, which become more significant with increasing areal densities, may be due to ferromagnetic coupling within the writing pole. One approach to resolving this is to form the writing pole by sputtering laminated layers of magnetic and nonmagnetic materials to prevent exchange coupling between the layers. However, additional processing, such as milling, is needed to define the shape of the sputtered writing pole.

BRIEF SUMMARY OF THE INVENTION

In one aspect, the present invention relates to a magnetic writing pole for writing perpendicularly to a magnetic medium. The writing pole includes a multilayer structure with alternately electroplated magnetic layers and electroplated non-magnetic layers. The writing pole has a down-track thickness near the magnetic medium of less than about 500 nm.

In another aspect, the present invention relates to a magnetic writer comprising a writing pole including at least three multiple layer structures. Each multiple layer structure includes a separate electroplated magnetic layer and a separate electroplated non-magnetic layer adjoining the electroplated magnetic layer. The multiple layer structures are laminated to form a stack of alternating magnetic and nonmagnetic layers.

In a further aspect, the present invention relates to a magnetic structure including a seed layer, an electroplated magnetic layer adjoining the seed layer, and a stack of at least three repeating units electroplated adjacent to the magnetic layer. Each repeating unit includes an electroplated non-magnetic layer and an electroplated magnetic layer, and an overall thickness of the magnetic structure is less than about 500 nm.

DETAILED DESCRIPTION

Figure 1:
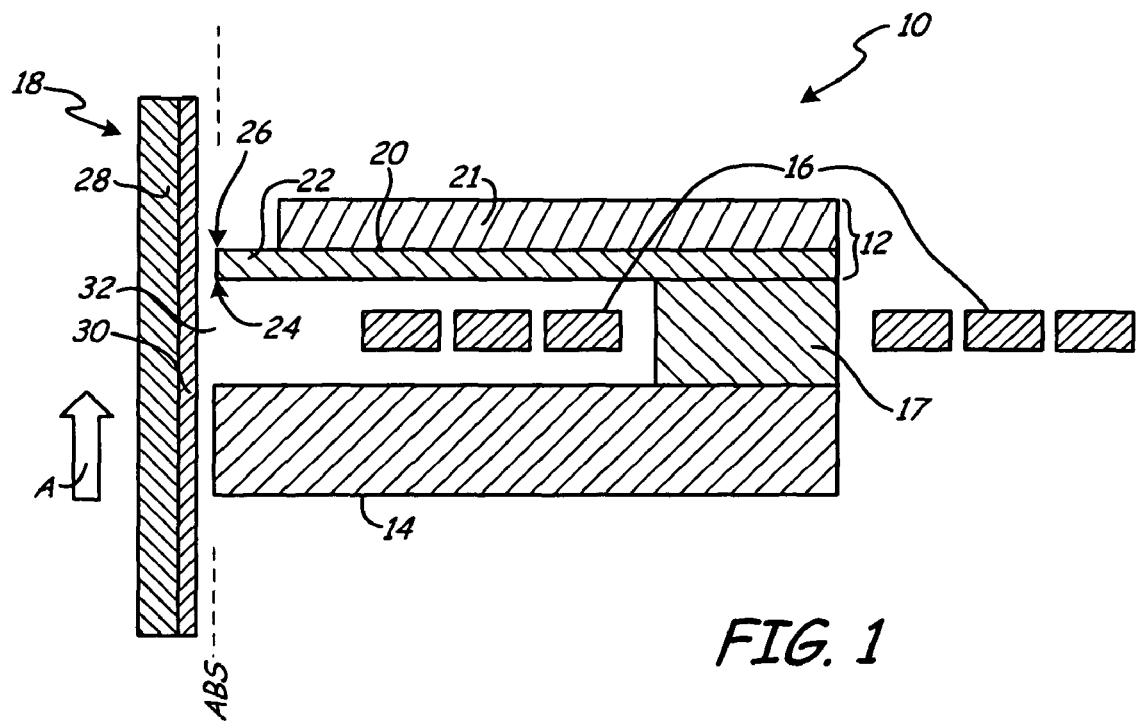
FIG. 1 is a cross-sectional view of a perpendicular magnetic recording head.

FIG. 1 is a cross-sectional view of a perpendicular writer 10, which includes main pole 12, return pole 14, and magnetization coils 16. Conductive coil 16 surrounds back gap closer 17 that magnetically couples main pole 12 to return pole 14. Perpendicular writer 10 confronts magnetic medium 18 at an air bearing surface (ABS) of main pole 12 and return pole 14. Main pole 12 includes main pole body 20, yoke 21, and main pole tip 22. Yoke 21 is coupled to an upper surface of main pole body 20 to improve efficiency of perpendicular writer 10. Main pole tip 22 has a leading edge 24 and a trailing edge 26. Magnetic medium 18 includes magnetically soft underlayer 28 and magnetically hard recording layer 30. It should be noted that the configuration for perpendicular writer 10 is merely illustrative, and many other configurations may alternatively be employed in accordance with the present invention. For example, perpendicular writer 10 may include multiple return poles, such as a configuration including a leading return pole that is coupled to yoke 21 through a leading back gap closer and a trailing return pole that is coupled to main pole body 20 through a trailing back gap closer.

Magnetic medium 18 travels or rotates in a direction relative to perpendicular writer 10 as indicated by arrow A. To write data to magnetic medium 18, an electric current is caused to flow through conductive coil 16, which passes through write gap 32 between main pole 12 and return pole 14. This induces a magnetic field across write gap 32. By reversing the direction of the current through conductive coil 16, the polarity of the data written to magnetic medium 18 is reversed. Because main pole 12 operates as the trailing pole, main pole 12 is used to physically write the data to magnetic medium 18. Accordingly, it is main pole 12 that defines the track width of the written data. More specifically, the track width is defined by the width of trailing edge 26 of main pole 12 at the ABS.

Figure 2:
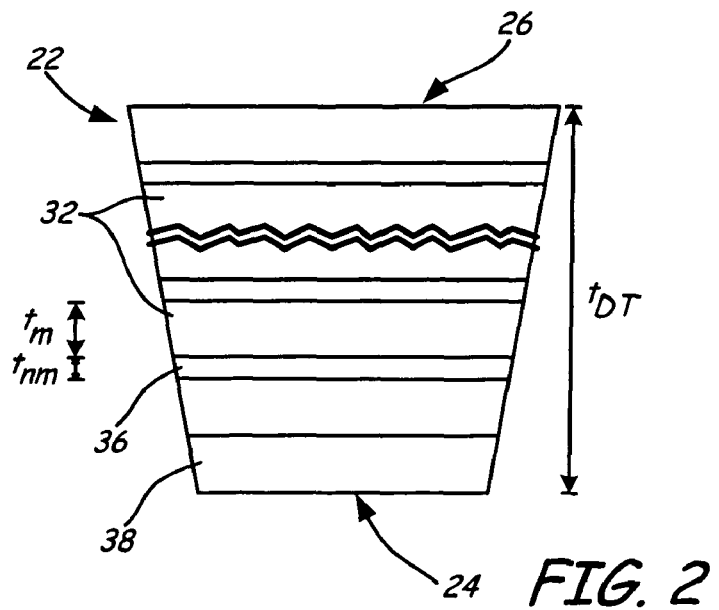
FIG. 2 is an air bearing surface (ABS) view of a trapezoidal main pole tip including alternately electroplated magnetic and non-magnetic layers.

FIG. 2 is an air bearing surface (ABS) view of main pole tip 22 including alternately electroplated magnetic layers 32 and non-magnetic layers 36. Magnetic layers 32 and non-magnetic layers 36 are formed on a seed layer 38. Magnetic layers 32 have a thickness $t_m$ and non-magnetic layers 36 have a thickness $t_{nm}$. The down-track thickness $t_{DT}$ of main pole tip 22, which is measured from leading edge 24 to trailing edge 26, is defined by the thicknesses of magnetic layers 32, non-magnetic layers 36, and seed layer 38. In various embodiments, the down-track thickness $t_{DT}$ of main pole tip 22 is less than about 500 nm, less than about 250 nm, and between about 50 nm and about 250 nm.

Magnetic layers 32 may be comprised of a material having a magnetic moment of at least about 2.0 tesla (T), and may have a thickness $t_m$ in the range of about 10 nm to about 100 nm. Alternatively, magnetic layers 32 may have a magnetic moment of about 2.2 T to about 2.4 T, about 2.1 T to about 2.3 T, and about 2.4 T, and the thickness $t_m$ of magnetic layers 32 may be about 20 nm to about 40 nm, and about 10 nm to about 50 nm. Example materials that may be used for magnetic layers 32 include CoFe, CoFeNi, CoFeRh, CoFeRu, CoFePt, CoFePd, and NiFe. The elemental components of each of the example materials for magnetic layers 32 may be varied to provide a material having desired properties. In various embodiments, magnetic layers 32 comprise CoFe including Fe in a proportion of about 50 atomic percent (at %) to about 70 at %, CoFeRh including Fe of about 50 at % to about 70 at % and Rh of less than about 1 at %, CoFeRu including Fe of about 50 at % to about 70 at % and Ru of less than about 2 at %, and CoFePd including Fe of about 50 at % to about 70 at % and Pd of less than about 2 at %, CoFeNi including Fe of about 50 at % to about 70 at % and Ni of less than about 8 at %, CoFePt including Fe of about 50 at % to about 70 at % and Pt of less than about 2 at %, and NiFe including Fe of at least about 65 at %.

Non-magnetic layers 36 decouple adjacent magnetic layers 32 to eliminate or substantially reduce fringing magnetic flux, which can be strong enough to partially or completely erase information recorded on the same or adjacent tracks of magnetic medium 18. Nonmagnetic layer thickness $t_{nm}$ is thick enough to break the exchange coupling between adjacent magnetic layers 32 (i.e., adjacent magnetic layers 32 have domain patterns that are essentially the same as if they were isolated from each other). In addition, nonmagnetic layer thickness $t_{nm}$ is thin enough to maintain magnetostatic coupling between adjacent magnetic layers 32 (i.e., adjacent magnetic layers 32 are coupled by fringing fields at the edge of the layers). In various embodiments, main pole tip 22 includes an even number of magnetic layers 32 to facilitate magnetostatic coupling between pairs of magnetic layers 32. In addition, non-magnetic layers 36 may also reduce the grain size of adjacent magnetic layers 32. This results in decreased coercivity and improved magnetic anisotropy for main pole 20.

Non-magnetic layers 36 comprises any non-magnetic material that may be formed by an electroplating process. For example, non-magnetic layers 36 may comprise a material such as NiP, NiCu, Pt, Ir, Cu, Rh, Ru, Pd, Au, Cr, NiCr, NiW, and NiPd, and may have a thickness $t_{nm}$ in the range of about 1 nm to about 25 nm. In other embodiments, thickness $t_{nm}$ is in the range of about 2 nm to about 15 nm, and about 1 nm to about 8 nm. The elemental components of each of the example materials for non-magnetic layers 36 may be varied to provide a material having desired properties. In various embodiments, non-magnetic layers 36 comprise NiP including P of about 14 at % to about 26 at %, NiCu including Cu of at least about 45 percent by weight (wt %), NiPd including Ni of less than about 10 at %, and NiW including W of at least about 9.5 at %.

The alternating magnetic layers 32 and non-magnetic layers 36 of main pole 20 are formed via an electroplating process, such as electrochemical plating. The electroplating may be performed using an alternating sequential two bath process, wherein magnetic layers 32 are formed in one bath while non-magnetic layers 36 are formed in the other bath. Alternatively, the electroplating may be performed in a single bath by sequentially switching the plating current density to alternately electroplate magnetic layers 32 and non-magnetic layers 36 (e.g., by applying pulse plating with a DC bias to grow laminated alloys). It is advantageous to use an electroplating process as opposed to a chemical sputtering process when forming a three-dimensional shape as required, for example, for main pole 20. It is possible to electroplate through a lithographic mask to form a three-dimensional shape, without a subsequent ion milling step that is required for chemical sputtering to define the three-dimensional shape. The same lithographic mask that is used to electroplate magnetic layers 32 may also be used to electroplate non-magnetic layers 36. Main pole 20 may also be formed in a trench of photoresist or dielectric material. The simpler electroplating process further provides better control and reduced variability in the critical dimensions of the three-dimensional structure. Structurally, the sputtered materials are columnar, while the electroplated materials are random polycrystalline. Because of this, the structural differences between sputtered materials and electroplated materials would be recognized at least by the use of transmission electron microscopy (TEM).

Main pole tip 22 may be configured to reduce a skew effect, which is caused by unwanted side writing that may occur due to the change in skew angle as the recording head travels in an arc across magnetic medium 18. For example, main pole 20 may be electroplated such that main pole tip 22 has a substantially trapezoidal shape at the ABS as is shown.

Magnetic layers 32 and non-magnetic layers 36 are alternately electroplated to form a stacked structure on seed layer 38. The material used for seed layer 38 may be a non-magnetic material that reduces galvanic corrosion of the adjacent magnetic layer 32. Galvanic corrosion can lead to low device yield and wafer scrap, and may be caused by the large ratio of the area of seed layer 38 to main pole 20 in perpendicular recording head designs. To prevent galvanic corrosion and damage to main pole 20 in the wafer fabrication process, a proper corrosion property match in materials for seed layer 38 and main pole 20 is critical.

Galvanic corrosion model calculations were performed for a main pole 20 including magnetic layers 32 comprising CoFe and non-magnetic layers 36 comprising NiP. The calculations used as inputs experimentally determined corrosion potentials, corrosion current densities, Tafel constants, and exposed surface areas for each of the individual materials. Based on the model calculations, the best materials for seed layer 38 have a low corrosion current density and a low corrosion potential with main pole 20. Examples of such materials include such as Ta and Hf. However, electroplated materials do not adhere well to Ta and Hf. Thus, a thin layer (~100 Å) of another material that provides better adhesion for electroplating, such as Ru, Rh, Au, Pd, Pt, Ir, NiCu, and NiZn, may be applied to the Ta or Hf. According to the model calculations, the most suitable non-magnetic seed layer for CoFe/NiP electroplated lamination are Hf and Ta with a thin layer of NiZn.

Figure 3A:
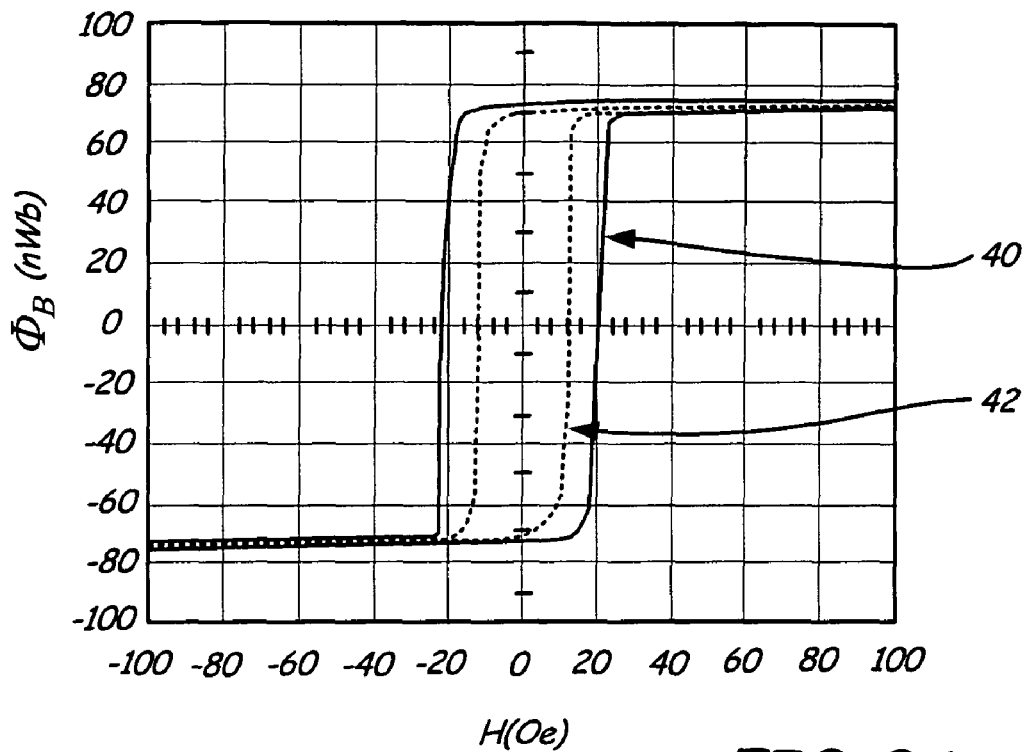
FIG. 3A is a graph of B-H loops along the easy and hard axes of magnetization of a film having a single magnetic layer.
Figure 3B:
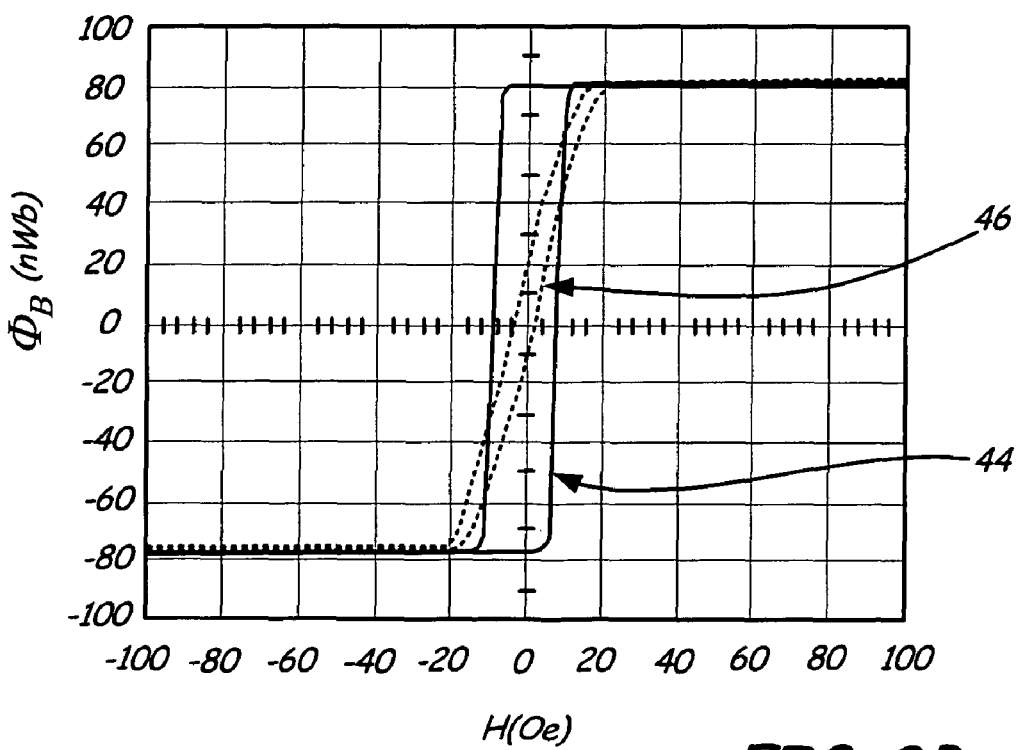
FIG. 3B is a graph of B-H loops along the easy and hard axes of magnetization of a film having alternately electroplated magnetic and non-magnetic layers.

FIG. 3A is a graph including lines 40 and 42 showing B-H loops along the easy and hard axes of magnetization, respectively, for a main pole having a single magnetic layer. FIG. 3B is a graph including lines 44 and 46 showing B-H loops along the easy and hard axes of magnetization for main pole 20 including alternately electroplated magnetic layers 32 and non-magnetic layers 36. For both main poles tested, the down-track thickness $t_{DT}$ of each main pole was 200 nm, magnetic layers 32 comprised CoFe, and non-magnetic layers 36 comprised NiP.

As is shown by lines 44 and 46, the coercivity (i.e., where the magnetic flux ($\Phi_B$ is zero) and the remnant flux (i.e., where the write field H is zero) were lower for main pole 20 than for a single layer main pole (lines 40 and 42). Consequently, the write current required to orient the domains of main pole 20 for the write operation is less than that required for the single layer main pole. In addition, the anisotropy field (i.e., where a line tangent to the hard axis B-H loop crosses the easy axis B-H loop) for main pole 20 was greater than the anisotropy field for the single layer main pole. This results in better domain control and more efficient operation of perpendicular writer 10.

Figure 4A:
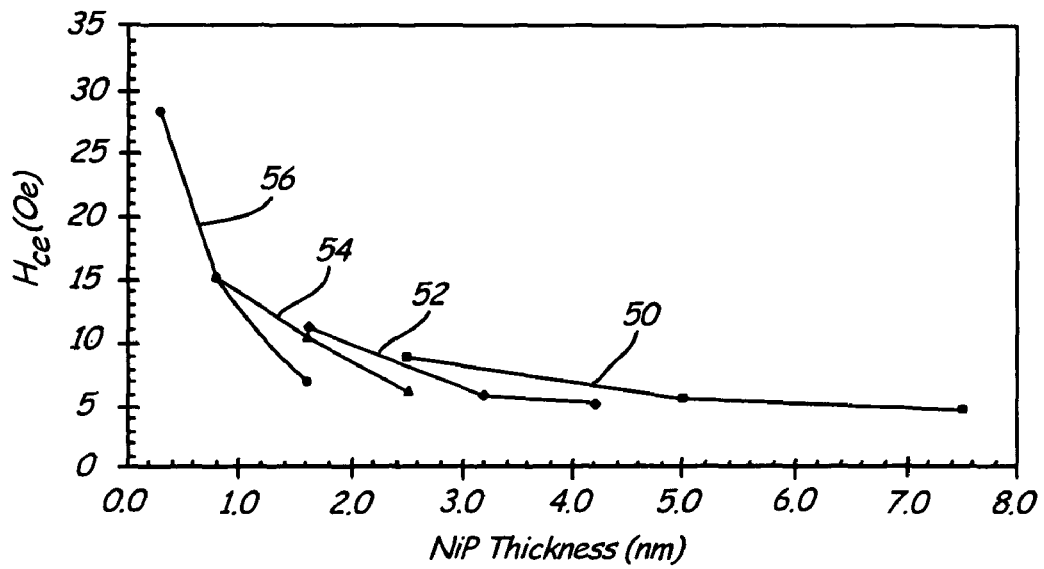
FIG. 4A is a graph of the easy axis coercivity versus non-magnetic layer thickness of films including different numbers of magnetic layers.
Figure 4B:
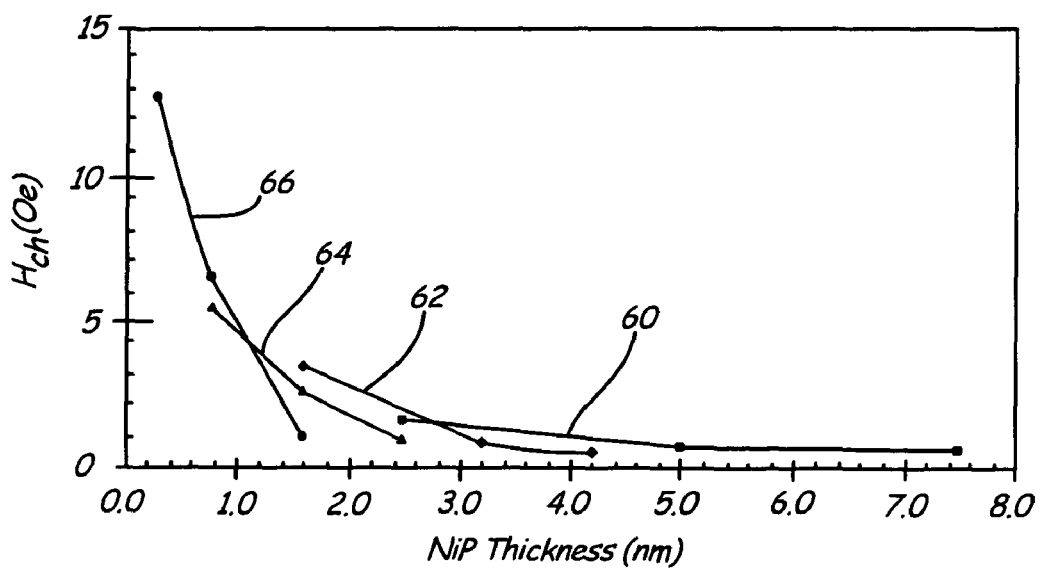
FIG. 4B is a graph of the hard axis coercivity versus non-magnetic layer thickness of films including different numbers of magnetic layers.

FIG. 4A is a graph of the easy axis coercivity versus non-magnetic layer thickness for main pole 20 having a including various numbers of magnetic layers. FIG. 4B is a graph of the hard axis coercivity versus non-magnetic layer thickness for main pole 20 including various numbers of magnetic layers. In both cases, the down-track thickness $t_{DT}$ of main pole tip 22 was about 200 nm, magnetic layers 32 comprised CoFe, and non-magnetic layers 36 comprised NiP.

Lines 50, 52, 54, and 56 show the easy axis coercivity versus non-magnetic layer thickness $t_{nm}$ for main pole 20 having 4, 6, 8, and 16 magnetic layers 32, respectively. Lines 60, 62, 64, and 66 show the hard axis coercivity versus non-magnetic layer thickness $t_{nm}$ for main pole 20 having 4, 6, 8, and 16 magnetic layers 32, respectively. As is shown in FIGS. 4A and 4B, at a constant thickness for non-magnetic layers 36, the coercivity of the film increases with increased magnetic layers (i.e., more magnetic layers 36 results in a magnetically softer main pole 20). In addition, the three points plotted on each line in FIGS. 4A and 4B correspond to average magnetizations of 2.3 T, 2.2 T, and 2.1 T, moving from left to right in the figure. Thus, with increasing thicknesses of non-magnetic layers 36 (i.e., with an increasing amount of non-magnetic material in main pole 20), the magnetization of main pole 20 decreases, resulting in a write field having a decreased strength.

In summary, the present invention is a magnetic writing pole for writing perpendicularly to a magnetic medium. The writing pole includes a multilayer structure with alternately electroplated magnetic layers and electroplated non-magnetic layers. The writing pole has a down-track thickness near the magnetic medium of less than about 500 nm. The multilayer structure may be formed by electroplating through a lithographic mask, such as with an alternating two-bath process (i.e., one each for the magnetic and non-magnetic layers). The resulting device is highly efficient, and has low sensitivity to skew in the writer system, low remnant magnetization, high anisotropy, and, with appropriate seed layer materials, reduced head corrosion. In addition, the resulting device need not be milled or otherwise reshaped after fabrication.

Although the present invention has been described with reference to preferred embodiments, workers skilled in the art will recognize that changes may be made in form and detail without departing from the spirit and scope of the invention.

The invention claimed is:

1. A magnetic writing pole for perpendicular writing, the magnetic writing pole comprising:
   a multilayer structure including alternately electroplated magnetic layers and electroplated non-magnetic layers, wherein a down-track thickness of the writing pole proximate the magnetic medium is less than about 500 nm, and wherein the electroplated magnetic and non-magnetic layers each comprise a random polycrystalline structure.

2. The magnetic writing pole of claim 1, wherein the magnetic layers have a thickness in a range of about 10 nm to about 100 nm, and the non-magnetic layers have a thickness in a range of about 1 nm to about 25 nm.

3. The magnetic writing pole of claim 1, wherein the non-magnetic layers have a thickness to effectively prevent exchange coupling between adjacent magnetic layers.

4. The magnetic writing pole of claim 1, wherein the magnetic layers comprise a material selected from the group consisting of (1) CoFe including Fe of about 50 at % to about 70 at %, (2) CoFeRh including Fe of about 50 at % to about 70 at % and Rh of less than about 1 at %, (3) CoFeRu including Fe of about 50 at % to about 70 at % and Ru of less than about 2 at %, (4) CoFePd including Fe of about 50 at % to about 70 at % and Pd of less than about 2 at % (5) CoFeNi including Fe of about 50 at % to about 70 at % and Ni of less than about 8 at %, (6) CoFePt including Fe of about 50 at % to about 70 at % and Pt of less than about 2 at %, and (7) NiFe including Fe of at least about 65 at %.

5. The magnetic writing pole of claim 1, wherein the magnetic layers have a magnetic moment of at least about 2.2 T.

6. The magnetic writing pole of claim 1, wherein the first non-magnetic layer comprises a material selected from the group consisting of NiP including P of about 14 at % to about 26 at %, NiCu including Cu of greater than about 45 wt %, Cu, Ir, Pt, Rh, Ru, Pd, Au, Cr, NiCr, NiW, and NiPd.

7. The magnetic writing pole of claim 1, wherein the magnetic writer comprises an even number of magnetic layers.

8. A magnetic writer comprising:
   a writing pole including at least three multiple layer structures, each multiple layer structure including a separate electroplated magnetic layer and a separate electroplated non-magnetic layer adjoining the electroplated magnetic layer, wherein the at least three multiple layer structures are laminated to form a stack of alternating magnetic and nonmagnetic layers, wherein each electroplated magnetic and non-magnetic layer comprises a random polycrystalline structure.

9. The magnetic writer of claim 8, and further comprising:
   a magnetic layer electroplated on the non-magnetic layer at a top of the stack.

10. The magnetic writer of claim 8, wherein the magnetic layer has a thickness in a range of about 10 nm to about 100 nm.

11. The magnetic writer of claim 8, wherein the non-magnetic layer has a thickness in a range of about 1 nm to about 25 nm.

12. The magnetic writer of claim 8, wherein the first magnetic layer comprises a material selected from the group consisting of CoFe, CoFeNi, CoFeRh, CoFeRu, CoFePt, CoFePd, and NiFe.

13. The writer pole of claim 8, wherein the first non-magnetic layer comprises a material selected from the group consisting of NiP, NiCu, Cu, Rh, Ru, Ir, Pt, Pd, Au, Cr, NiCr, NiW, and NiPd.

14. The magnetic writing pole of claim 8, wherein the magnetic writer comprises an even number of magnetic layers.

15. The magnetic writer of claim 8, wherein the magnetic writer is configured to reduce a skew effect during writing to a magnetic medium.

16. The magnetic writer of claim 8, and further comprising:
   a return pole magnetically coupled to the writing pole distal from the magnetic medium.

17. A magnetic structure comprising:
a seed layer;
an electroplated first magnetic layer adjoining the seed layer;
an electroplated first non-magnetic layer directly adjoining the first magnetic layer in physical contact therewith;
an electroplated second magnetic layer directly adjoining the first non-magnetic layer in physical contact therewith;
an electroplated second non-magnetic layer directly adjoining the second magnetic layer in physical contact therewith;
an electroplated third magnetic layer directly adjoining the second non-magnetic layer in physical contact therewith;
an electroplated third non-magnetic layer directly adjoining the third magnetic layer in physical contact therewith; and
an electroplated fourth magnetic layer directly adjoining the third non-magnetic layer in physical contact therewith,
wherein each of the electroplated magnetic and non-magnetic layers comprises a random polycrystalline structure, and
wherein a thickness of the magnetic structure is less than about 500 nm.

18. The magnetic structure of claim 17, wherein the magnetic structure comprises an even number of magnetic layers.

19. The magnetic structure of claim 17, wherein the seed layer comprises a seed material selected from the group consisting of Hf and Ta.

20. The magnetic structure of claim 19, wherein the seed layer further comprises a thin layer of NiZn on the seed material.

* * * * *

UNITED STATES PATENT AND TRADEMARK OFFICE
CERTIFICATE OF CORRECTION

| | | |
|---|---|---|
| PATENT NO. | : 7,777,989 B2 | Page 1 of 1 |
| APPLICATION NO. | : 11/451236 | |
| DATED | : August 17, 2010 | |
| INVENTOR(S) | : Ming Sun et al. | |

It is certified that error appears in the above-identified patent and that said Letters Patent is hereby corrected as shown below:

Col. 6, Lines 1-3
    Delete ", and wherein the electroplated magnetic and non-magnetic layers each comprise a random polycrystalline structure"

Col. 6, Lines 39-41
    Delete ", wherein each electroplated magnetic and non-magnetic layer comprises a random polycrystalline structure"

Signed and Sealed this
Fifth Day of July, 2011

David J. Kappos
*Director of the United States Patent and Trademark Office*